United States Patent Office 2,827,485
Patented Mar. 18, 1958

2,827,485

MANUFACTURE OF FLUORINATED ACETATES

Charles B. Miller and Cyril Woolf, Morristown, N. J., assignors to Allied Chemical & Dye Corporation, New York, N. Y., a corporation of New York No Drawing. Application March 14, 1955
Serial No. 494,236

8 Claims. (Cl. 260—539)

This invention is directed more particularly to manufacture of alkali metal trihaloacetates wherein at least one of the halogens is fluorine and any remaining halogen is chlorine, and also to production of the corresponding trihaloacetic acids. The invention comprises methods for making especially $CFCl_2.COOM$, $CF_2Cl.COOM$, and $CF_3.COOM$ where M is an alkali metal, and also $CFCl_2.COOH$, $CF_2Cl.COOH$, and $CF_3.COOH$.

A particular object of the invention lies in provision of methods for making the foregoing products using certain perchlorofluoroacetones as starting materials.

Ketones which may be employed as starting materials in the practice of the invention are perchlorofluoroacetones containing 1 to 5 inclusive fluorine atoms per mol, i. e. $C_3OCl_{6-x}F_x$ where $x$ is an integer from 1 to 5. Starting materials particularly adapted for use are $CFCl_2.CO.CCl_3$ (B. P. 163–166° C.), $CFCl_2.CO.CFCl_2$ (B. P. 118–122° C.), $CF_2Cl.CO.CCl_3$ (B. P. 118–122° C.), $CClF_2.CO.CCl_2F$ (B. P. 84.2° C.), $CF_3.CO.CCl_3$ (B. P. 83.5–84.5° C.), $CF_2Cl.CO.CF_2Cl$ (B. P. 44° C.), $CF_3.CO.CFCl_2$ (B. P. 44° C.), and $CF_3.CO.CF_2Cl$ (B. P. 7–11° C.). Under ordinary conditions all of these compounds are substantially colorless liquids. In general, certain of such compounds may be made for example by effecting reaction between hexachloroacetone and an anhydrous HF or other fluorinating agent at moderately elevated temperature while in the presence of antimony pentahalide and while maintaining the reaction mass substantially in the liquid phase, and thereafter recovering the particular perchlorofluoroacetones from the reaction products by suitable procedure such as distillation. Certain other organic starting compounds may be made by reacting certain perchlorofluoroacetones with aluminum chloride and recovering such compounds from reaction products by suitable distillation. Hereinbelow Examples A–F are illustrative of methods for making the perchlorofluoroacetone materials there noted. Manufacture of perchlorofluoroacetones and processes for making the same are discussed in greater detail and claimed in our copending applications Serial Nos. 494,237 and 494,238, filed March 14, 1955 (respectively continuations-in-part of our applications Serial Nos. 411,028 and 411,027, filed February 17, 1954, now abandoned).

In accordance with the present invention, it has been found that the alkali metal trihaloacetates under consideration may be made from ketones containing a trihalomethyl group adjacent to the carbonyl unit principally and preferably by alkaline scission resulting in the conversion of the trihalomethyl group to a haloform, and formation of a salt of trihaloacetic acid.

Procedurally, practice of the invention in the broader aspects involves treatment of perchlorofluoroacetones containing 1 to 5 inclusive atoms of fluorine per mol with alkali metal hydroxides to produce alkali metal trihaloacetates as one group of products of the invention. If the corresponding acids are desired, such acids can be made by acidification of the perchlorofluoroacetone-alkali metal hydroxide reaction products followed by isolation and recovery of the acids. Either sodium or potassium hydroxide may be utilized as the alkaline reagent. In accordance with the invention processes, the perchlorofluoroacetone containing 1 to 5 inclusive fluorine atoms per mol is reacted with an alkali metal hydroxide either dissolved in water, or suspended in a suitable inert solvent.

Our investigations indicate that reactions take place simultaneously along two courses, either of which may be made to dominate by regulation of reaction conditions. In both reactions, the same alkali metal trihaloacetate, wherein at least one of the halogens is fluorine and any remaining halogen is chlorine, is formed. On the basis of our work, it appears that reactions involved in the invention processes proceed in accordance with the following illustrations:

(Equation A)

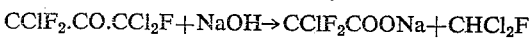

(Equation B)

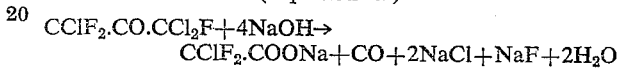

Reaction of Equation A is characterized by alkaline scission of the $CCl_2F$ radical, while the reaction of Equation B is characterized by halogen attack of the $CCl_2F$ radical resulting in decomposition and formation of CO, NaCl, NaF and $H_2O$ as by-products.

In practice of the invention, the ketone may be added to the alkali metal hydroxide contained in a suitable reaction vessel. Agitation and external cooling in the reaction vessel facilitate removal of reaction heat. Alternatively, the alkali metal hydroxide may be added to the ketone. The ketone may, if desired, be diluted with e. g. 1 to 3 mols of water per mol of ketone prior to reaction to dissipate heat of hydration, although the reaction takes place rapidly and by the same courses without water dilution. In preferred embodiments, the alkali metal hydroxide is dissolved in water and may be utilized in the form of water solutions of hereinafter discussed alkali metal hydroxide strengths. If desired, an inert liquid diluent such as benzene may be employed, such a diluent being particularly useful if powdered hydroxide or concentrated solutions of the hydroxide are to be used.

During mixing or incorporation of the perchlorofluoroacetone and the alkali metal hydroxide temperatures in the reaction vessel are maintained not in excess of 50° C., and ordinarily not in excess of 40° C. In usual practice, best results are obtained where temperatures are maintained in the range of about minus 10° C. to 40° C. In some instances, subsequent to mixing or incorporation of the perchlorofluoroacetone and the alkali metal hydroxide and subsidence of initial reaction heats, for the purpose of effecting completion of reaction, temperature of the mass in the reaction vessel may be raised e. g. by external heating up to about 100° C.

In the preferred embodiments, during the course of the reaction, depending upon the particular ketone employed as starting material, the haloforms $CHCl_3$ (B. P. 62° C.), $CHCl_2F$ (B. P. 8.9° C.), or $CHClF_2$ (B. P. minus 40.8° C.) are produced. The haloforms $CHClF_2$ and, under best working conditions, $CHCl_2F$ distill out from the reaction vessel, and may be collected by any suitable means such as cooling by use of Dry Ice traps. If the ketone starting material employed is such and reaction conditions are such that chloroform is produced, on completion of the ketone-alkali metal hydroxide reaction, the chloroform may be distilled out of the mass in the reaction vessel, or the reaction mass may be permitted to separate into a chloroform phase, and a liquid phase containing alkali metal trihaloacetate. If the latter phase is aqueous, the acetate is in solution, and if an additional phase largely composed of an inert diluent such as benzene is present, the acetate may be in solution or be present as a suspended solid depending upon the amount of water present. Where reaction conditions are such that NaCl, NaF, $H_2O$ and CO are formed, CO passes off as a gas, while the other three by-products remain in the reaction mass.

When carrying out the invention under all conditions of operation, reactions proceed simultaneously to some extent as exemplified in both Equations A and B. In each instance, the same alkali metal acetate is produced, although in the one case the more valuable haloform by-product is formed, while in the other circumstance the less desirable and valuable by-products NaCl and NaF are produced. One of the invention objectives is provision of control conditions by which reaction along the lines of Equation A predominates, i. e. regulation of the reaction so as to produce the alkali metal trihaloacetate together with the more valuable haloform. In accordance with the invention, it has been found that dominance of haloform by-product formation may be effected by control of two reaction conditions, namely, temperature and the form in which the alkali metal hydroxide is used.

In general, temperature conditions are as stated above. However, to promote the course of reaction of dominant haloform production the lower temperatures are preferred. Particularly during incorporation of the ketone and alkali metal hydroxide, temperature should not be above about 40° C., and preferably somewhere in the range of minus 10 up to e. g. 25° C. These temperature conditions are especially applicable during incorporation of the ketone and the alkali metal hydroxide, after the accomplishment of which the higher temperatures above noted may be utilized if desired to promote completion of reaction.

It has been discovered that a major factor involved in directing dominance of reaction along the course of Equation A or of Equation B is the form and concentration in which the alkali metal hydroxide is employed, as distinguished from the overall quantity of alkali metal hydroxide introduced into the reaction. While in general practice of better forms of the invention, it is usually preferred to use not more than about two mol proportions of alkali metal hydroxide per mol of perchlorofluoroacetone, aside from supplying to the operation at hand a total quantity of alkali metal hydroxide sufficient to effect satisfactory conversion of the ketone starting material, and completion of reaction, the quantity of alkali metal hydroxide used is of no major importance with regard to regulating dominance of reaction along either course.

We have found that when the concentration of the alkali metal hydroxide as charged into the reaction is relatively low, the scission reaction of Equation A predominates, and that as the concentration of the alkali metal hydroxide is increased, halogen attack or decomposition of one radical of the ketone correspondingly increases. In the better embodiments of the invention, the alkali metal hydroxide is utilized in the form of a relatively low alkali metal hydroxide strength water solution. It has been discovered that if, in usual practice, the aqueous alkali metal hydroxide solution contains less than about 40 weight percent of hydroxide, the scission reaction predominates. In the more preferred aspects, aqueous alkali metal hydroxide solutions containing not more than about 25 weight percent of hydroxide are employed, and we find that, by so proceeding, halogen attack on the ketone may be limited to about 35% or less, i. e. less than about 35% of the total ketone starting material reacts in accordance with Equation B with resultant formation of the less desirable by-products. More dilute alkali metal hydroxide solutions may be employed if desired, although solutions of hydroxide concentration as low as about 10% cause some halogen attack. Thus, preferred forms of the invention embody the use of water solutions having not more than about 25% alkali metal hydroxide concentration.

It has been observed that when an aqueous alkali metal hydroxide having a concentration of more than about 60% is employed, the halogen attack or decomposition reaction typified by Equation B predominates. For instance, we find that use of the alkali metal hydroxide in powdered form, e. g. along with a carrying diluent such as benzene, increases the extent of reaction by the halogen attack route to such an extent that as much as 100% of the ketone starting material is subjected to halogen attack and substantially no haloform is produced.

As shown above and demonstrated by appended examples illustrating practice of the invention, the reactions described proceed simultaneously by two routes either of which may be made to preponderate in accordance with the variable reaction control conditions described. Unexpected features of our investigations comprise the discovery that no matter which reaction predominates each reaction produces the same alkali metal trihaloacetate. Further, we have found that, regardless of variability of reaction conditions, when an asymmetric (with respect to fluorine) perchlorofluoroacetone is used as starting material, the reaction product does not contain a mixture of e. g. $CClF_2.COONa$ and $CCl_2F.COONa$, but there is formed only a single acetate salt which contains fluorine atoms in number equal to the number of fluorine atoms present in the ketone radical having the highest number of fluorine atoms. This major advantage afforded by the invention is well shown by an operation such as exemplified by above Equations A and B in which the reaction product contains no $CCl_2F.COONa$, and the acetone salt product formed contains two fluorine atoms, which fluorine content corresponds with the $CClF_2$ radical of the ketone rather than with the $CCl_2F$ radical. Hence, in practice of the invention preferred starting materials are the asymmetric perchlorofluoroacetone compounds, the more preferred starting materials being $CFCl_2.CO.CCl_3$, $CF_2Cl.CO.CCl_3$, and $CF_3.CO.CCl_3$. Moreover, we have found also that, to the extent reaction designedly or unavoidably takes the course of Equation B, trihalomethyl attack is effected on the trihalomethyl ketone radical containing no fluorine or the fewer number of fluorine atoms.

On completion of reaction, in accordance with the preferred embodiments, i. e. using relatively weak aqueous alkali metal hydroxide solutions, the particular alkali metal trihaloacetate is present in solution in the reaction liquor. Where strong alkali metal has been employed, such as powdered hydroxide in an inert diluent as benzene, the alkali metal trihaloacetate produced is present either as a solid or in relatively slurry-like condition, and the bulk of the inert diluent may be decanted off. To recover any acetate salt as a product, the reaction liquor may be evaporated to dryness under reduced pressure of e. g. 50 mm. of Hg, and the acetate salt leached out of the dry solid with alcohol. The alcohol may be evaporated off at low pressure, or the acetate salt may be crystallized out of a low alcohol slurry. Alternatively, where the reaction liquor is adequately aqueous, the salt may be crystallized out, as for example by vacuum evaporation of water until the solid content is about 40–50%, cooling, filtering off NaCl and NaF, and then reducing the water content still further by vacuum evaporation until the water content is about 20%, then cooling and filtering.

If the trihaloacetic acid corresponding to an alkali metal trihaloacetate salt is desired as the end product, such acid may be isolated from the ketone-alkali metal hydroxide reaction product subsequent to acidification by a strong acid. If an inert diluent is present in the reacted mass, the diluent may be first removed by decantation, filtration or distillation. Sulfuric acid is the most suitable liberating acid, although other strong acids such as hydrochloric and phosphoric may be employed if desired. Sulfuric acid may be added in amount such that one or more mols of free $H_2SO_4$ is present per mol of water present, and the perhaloacetic acid may be distilled therefrom together with any HCl and/or HF liberated, the HCl and/or HF passing out of the distillation system uncondensed. Alternatively, about one mol of $H_2SO_4$ per mol of alkali metal hydroxide initially used may be added to the reaction mass, and the perhaloacetic acid extracted with a suitable solvent such as benzene or chloroform. The extract may be dried for example by azeotropic distillation in which all of the water and some of the benzene is distilled off as overhead. The residual perhaloacetic acid-benzene liquid then may be fractionally distilled to recover the perhaloacetic acid in pure form.

Following Examples A–F illustrate methods for making certain hereindescribed perchlorofluoroacetone starting materials.

*Example A.*—Manufacture of $CFCl_2CO.CCl_3$.—530 grams of hexachloroacetone and 30 grams of $SbCl_5$ were charged to a reactor. The total of organic starting material and antimony pentahalide charged contained about 5 mol percent of the latter. The mass was gassed with HF for about 8 hours at temperature of about 110° C. until 1.6 mols of HCl had been formed. The reaction product was washed with small portions of 20 weight percent HCl to remove antimony halide, dried, and fractionated to recover 420 grams $CCl_3.CO.CCl_2F$, B. P. 163–166° C.

*Example B.*—Manufacture of $CFCl_2.CO.CFCl_2$.—260 grams of hexachloroacetone, 23 grams (10 cc.) of $SbCl_5$, and 360 grams of $SbF_3$, were heated in a reactor at temperature of about 140° C. and refluxed for 30 minutes. The total of organic starting material and antimony pentahalide charged contained about 7 mol percent of the latter. The reaction product was cooled, and the supernatant product decanted from unreacted fluorinating agent and catalyst. Fractional distillation resulted in recovery of 110 grams of $CCl_2F.CO.CCl_2F$, B. P. 118°–122° C., together with some higher fluorinated acetones.

*Example C.* — Manufacture of $CF_2Cl.CO.CFCl_2$, $CF_2Cl.CO.CF_2Cl$, and $CF_3.CO.CClF_2$.—360 grams of $SbF_3$, 300 grams of $SbCl_5$, and 264 grams of hexachloroacetone were heated in a reactor the exit of which was connected with a fractionating still. The total of organic starting material and antimony pentahalide charged contained about 50 mol percent of the latter. Reaction was allowed to proceed at temperature of 105°–110° C. for 2 hours, and then the product was distilled out during 3 hours until the still pot temperature reached 190° C. Refractionation of product yielded mainly

$CCl_2F.CO.CClF_2$

B. P. 84.2° C. (133 g.=62% yield), $CClF_2.CO.CClF_2$, B. P. 44° C. (59 g.=29% yield), and $CF_3.CO.CClF_2$, B. P. 7–11° C. (6 g.=4% yield.)

*Example D.*—Manufacture of $CF_2Cl.CO.CCl_3$.—400 grams of liquid, substantially colorless $CClF_2.CO.CClF_2$ (B. P. 44° C. and made e. g. in accordance with Example C) were mixed with 60 grams of anhydrous, powdered $AlCl_3$ in a reactor provided with a reflux condenser regulated to effect total refluxing of the evolved vapors. Reaction was exothermic and refluxing spontaneously occurred. Without application of external heat, exothermic heat maintained continuance of reaction for about an hour, after which refluxing subsided. Substantially all of the liquor in the reactor was then distilled away from the aluminum halides, and the total condensate thus recovered was fractionated. Some unreacted $CClF_2.CO.CClF_2$ (B. P. 44° C.) starting material was boiled off as heads and recovered. Thereafter, an overhead having a vapor temperature of about 120° C. distilled over, and 76 grams of a substantially colorless liquid identified as $CClF_2.CO.CCl_3$ and having a boiling point of 120° C. were recovered.

*Example E.*—Manufacture of $CF_3.CO.CCl_3$.—183 grams of liquid, substantially colorless $CF_3.CO.CClF_2$ (B. P. 7–11° C. and made e. g. in accordance with Example C) were slowly dripped during a period of about 4 hours into a flask containing 100 grams of anhydrous powered $AlCl_3$. The flask was immersed in an oil bath maintained at 60° C., and was connected to an ice-cooled reflux condenser. Subsequent to addition of the ketone, reflux was continued for an additional 6 hours with increased reactor temperature up to about 75° C. Then substantially all of the liquid contents of the flask were distilled away from the aluminum halides. The resulting condensate was fractionated. Some unreacted $CF_3.CO.CClF_2$ starting material was boiled off as heads and recovered. Thereafter, an overhead having a vapor temperature of about 83–85° C. distilled over, and 120 grams of substantially colorless liquid identified as $CF_3.CO.CCl_3$ and having a boiling point of about 83.5–84.5° C. were recovered.

*Example F.*—Manufacture of $CF_3.CO.CCl_2F$.—120 grams of liquid, substantially colorless $CF_3.CO.CCl_3$ (B. P. 83.5–84.5° C. and made e. g. in accordance with Example E), 100 grams of $SbF_3$ and 93 grams of $SbCl_5$ were charged into a reactor connected to a fractionating column and a reflux condenser. The total of organic starting material and antimony pentahalide charged contained about 38 mol percent of the latter. The mass in the reactor was heated at temperature of about 95–100° C. Reflux conditions were adjusted so as to effect slow discharge from the reflux condenser of a fraction boiling at about 43–46° C. This condensate was redistilled, and 70 grams of substantially colorless liquid identified as $CF_3.CO.CCl_2F$ and having a boiling point of about 44° C. were recovered.

The following examples are illustrative of practice of the invention:

*Example 1.*—1.5 mols of NaOH, as a 20% strength water solution, were added to 1.0 mol of $CCl_2F.CO.CCl_3$, B. P. 163–166° C. over a period of about 60 minutes. During incorporation of the NaOH solution, the reacting mass was maintained at a temperature of about 40° C. After about another hour, during which temperature did not exceed 40° C., the reaction mass was cooled to about 25° C., permitted to settle, and about 96 g. of chloroform were separated by decantation. The chloroform recovered amounted to about 80% of theory in accordance with Equation A above. The remaining aqueous reaction product was found to contain about 0.62 mol of NaCl. In this run about 20% of the original ketone had been subjected to halogen attack resulting in formation of by-products other than a haloform such as CO, NaCl, NaF, and $H_2O$, as indicated by Equation B. This reaction product containing $CCl_2F.COONa$ in solution was treated with about 1.5 mols of 100% $H_2SO_4$, in the form of 96% strength sulfuric acid. About 200 grams of benzene were added to extract $CCl_2F.COOH$. The extract was dried by azeotropic distillation of some of the benzene and all of the water present, and the dried benzene-$CCl_2F.COOH$ extract was fractionally distilled to recover $CCl_2F.COOH$ (B. P. 162° C.) as overhead. The quantity of $CCl_2F.COOH$ recovered amounted to 95% of theory.

*Example 2.*—To one mol of $CCl_2F.CO.CCl_2F$ (B. P. 118–122° C.) were added 2 mols of NaOH, as a 20% strength water solution, over a period of about 90 minutes. During addition of the NaOH, temperature of the mass in the reaction vessel was maintained at about 20° C. About 70 g. (0.67 mol) of $CHCl_2F$ (B. P. 8.9° C.) were evolved in the course of the reaction and were recovered in a Dry-Ice trap. About 2 mols of 100% $H_2SO_4$, as a 96% sulfuric acid solution, were added to the mass in the reaction vessel. Similarly as in Example 1, the $CCl_2F.COOH$ formed by acidification of the $CCl_2F.COONa$ was benzene extracted, the extract dried, and the quantity of $CCl_2F.COOH$ recovered on final fractional distillation amounted to 93% of theory.

*Example 3.*—One mol of $CClF_2.CO.CCl_3$ (B. P. about 120° C.) was slowly added while agitating over a period of about 90 minutes to 1.8 mols of NaOH, as 20% strength water solution. During addition of the NaOH solution, the reaction vessel was cooled externally to maintain reaction temperature at about 25° C. After a succeeding 1½ hours, the liquid phases formed in the reaction vessel were separated, and about 0.75 mol of CHCl₃ was recovered. Analysis of the remaining aqueous phase showed the presence of 0.76 mol chloride ion, indicating that about 25% of the ketone starting material had been subjected to halogen attack. This aqueous phase containing $CClF_2.COONa$ in solution was acidified by addition of 2 mols of 100% $H_2SO_4$ as 96% sulfuric acid. $CClF_2.COOH$ was extracted from the acidified liquor with benzene as in Example 1, and $CClF_2.COOH$ (B. P. 121° C.) was recovered from the dried extract in amount equal to 95% of theory.

*Example 4.*—One mol of $CClF_2.CO.CCl_2F$ (B. P. 84.2° C.) was added slowly over a period of about 120 minutes to 220 g. of powdered 85% KOH (3.3 mols of 100% KOH) suspended in about 500 g. of benzene. During incorporation of the KOH, the mass was agitated, and external cooling of the reaction vessel was such as to maintain temperature of the reacting mass at about 30–40° C. Carbon monoxide and $CHCl_2F$ were evolved and about 0.4 mol of $CHCl_2F$ was collected in a Dry-Ice trap. The bulk of the benzene was decanted off from the reacted mass, and the solid relatively slurry-like potassium salt product $CClF_2.COOK$ was dissolved by addition of about 100 g. of water. Analysis of the resulting aqueous solution for chloride and fluoride ions showed that about 60% of the original ketone had been subjected to halogen attack. The aqueous solution was acidified by addition of about 400 g. of 100% $H_2SO_4$, as 96% sulfuric acid solution. Following benzene extraction, azeotropic removal of water, and distillation similarly as in Example 1, $CClF_2.COOH$ (B. P. 121° C.) was recovered in amount equal to 92% of theory.

*Example 5.*—One mol of $CClF_2.CO.CCl_2F$ was mixed with cooling with 18 g. of water to which were added 2 mols of NaOH, as a 20% strength water solution. The NaOH solution was added over a period of about 1¼ hours, and temperature of the mass in the reaction vessel was maintained at about minus 6° C. to 0° C. During the following hour and a half, temperature was increased by external heating to about 37° C. In the course of the operation, about 0.7 mol of $CHCl_2F$ was evolved, indicating that about 30% of the ketone starting material had been subjected to halogen attack. In a similar operation, differing only in that the ketone starting material was added to the alkali, the same results were obtained.

*Example 6.*—75 g. NaOH (1.9 mols) were dissolved in 266 g. of water and added to one mol of

$CClF_2.CO.CCl_2F$ which had been mixed with about 36 g. of water. During addition, temperature of the materials in the reactor were held at about 15–20° C. About 71 g. (0.68 mol) of $CHCl_2F$ were evolved and recovered in a Dry-Ice trap, showing halogen attack of about 32%. The residual material in the reaction vessel containing $CClF_2.COONa$ in solution was acidified with about 2 mols of 100% $H_2SO_4$, as 96% sulfuric acid solution. The product was extracted with benzene, water removed azeotropically, and on final distillation $CClF_2.COOH$ (B. P. 121° C.) was recovered in amount equal to 90% of theory.

*Example 7.*—0.1 mol of $CClF_2.CO.CCl_2F$ was added slowly while cooling to about 22 g. KOH (0.33 mols) dissolved in 85 g. of water (20% strength solution). $CHCl_2F$ was evolved and recovered, and $CClF_2.COOK$ formed. Analysis of the product remaining in the reaction vessel showed that about 35% of ketone had been subjected to halogen attack.

*Example 8.*—0.1 mol of $CClF_2.CO.CCl_2F$ was incorporated with 0.2 mol of NaOH as a 1.0 N aqueous solution (about 4% strength solution). Temperature was maintained at about 15° C. during addition of the NaOH solution. $CClF_2.COONa$ was formed. Analysis of the mass in the reaction vessel showed that about 25% of the ketone had been subjected to halogen attack.

*Example 9.*—One mol of $CClF_2.CO.CClF_2$ (B. P. 44° C.) was added dropwise during one hour to a cooled agitated suspension of 160 g. powdered NaOH (4 mols) in 500 cc. of benzene. Reaction temperature was maintained at about 40° C. Carbon monoxide was evolved. After a further period of about 2 hours, to permit completion of reaction, the reaction product was cooled to about 20° C. and filtered. The solids were dried by heating under vacuum at about 50° C. Analysis showed that the dried solids contained 1.8 mols of NaF and 0.9 mol of NaCl. The solid reaction product containing $CClF_2.COONa$ was treated with 600 g. of 100% $H_2SO_4$ (6.1 mols), as 96% sulfuric acid solution, and $CClF_2.COOH$ and small amounts of HF and HCl were distilled out. Redistillation of the crude $CClF_2.COOH$ gave 122 g. of $CClF_2.COOH$, equal to 94% of theory.

*Example 10.*—0.1 mol $CF_3.CO.CClF_2$ (B. P. 7–11° C.) was slowly distilled into an agitated suspension of 0.4 mol powdered NaOH in 50 cc. of benzene, during which operation temperature of the reacting mass was maintained at about 5° C. The temperature was then maintained at about 30° C. by external heating for a further 2 hours in order to complete the reaction. Most of the benzene was removed by decantation. On analysis, the remaining reacted material, containing $CF_3.COONa$ in solid slurry like form, showed that most of the ketone had been subjected to halogen attack. The reacted material was subjected to acidification by addition of about 98 g. (1.0 mol) of 100% $H_2SO_4$, as 96% sulfuric acid solution. The mass was distilled in the presence of the sulfuric acid, and $CF_3.COOH$ (B. P. 71–73° C.) was recovered as overhead in quantity amounting to 90% theory yield.

*Example 11.*—10.25 mols (54 g.) of $CF_3.CO.CCl_3$, B. P. 83.5–84.5° C., were mixed with cooling with 5 g. of water. To this mixture cooled in an ice bath was slowly added 0.5 mol (20 g.) of NaOH dissolved in 60 g. of water over a period of about 30 minutes. During incorporation of the NaOH solution, the reaction mass was maintained at a temperature of about 10–15° C. After the NaOH solution had been added, temperature was raised to about 50° C. and maintained at that point for about an hour to facilitate completion of reaction. The reaction mass containing $CF_3.COONa$ in solution after cooling to about room temperature, was treated by slow addition of 350 g. of 96% sulfuric acid. Chloroform and $CF_3.COOH$ were distilled out, and fractionation of the crude condensate thus obtained gave 27 g. (92% of theory) of $CF_3.COOH$, B. P. 71–73° C., and 24 g. of CHCl₃ (80% of theory).

*Example 12.*—2 mols of NaOH, as a 20% aqueous solution, were added during a period of about one hour to a cooled mixture of 36 g. of water and one mol of $CClF_2.CO.CCl_2F$, B. P. 84.2° C. During incorporation of the NaOH solution, temperature of the reacting mass was maintained at about 10° C. Temperature was then raised to about 50° C. for about an hour to facilitate completion of reaction. During such heating, about 0.70 mol of $CHCl_2F$ was evolved and recovered. To the thus obtained aqueous reaction product, 0.16 mol (17.6 g.) of $CaCl_2$, dissolved in 35 g. of water was added, and the $CaF_2$ formed was filtered off. The filtrate was evaporated to dryness at subatmospheric pressure, crushed, and extracted three times with 200 g. each cycle of 95% ethyl alcohol. The filtered extract was evaporated to dryness under subatmospheric pressure, and 142 g. (96% of theory) of $CClF_2.COONa$ were obtained.

The hereindescribed fluorochloro acids are known in the art. The mono and tri fluoro acids are suitable for use as esterification catalysts, and the mono and di fluoro acids constitute effective solvents for cellulose.

We claim:
1. The process which comprises mixing an asymmetric perchlorofluoroacetone containing 1 to 5 fluorine atoms and an alkali metal hydroxide, and maintaining temperature not in excess of about 50° C. during said mixing, thereby to form an alkali metal trihaloacetate wherein at least one of the halogens is fluorine and any remaining halogen is chlorine.
2. The process of claim 1 in which the perchlorofluoroacetone is $CFCl_2.COCCl_3$.
3. The process of claim 1 in which the perchlorofluoroacetone is $CF_2Cl.CO.CCl_3$.
4. The process of claim 1 in which the perchlorofluoroacetone is $CF_3.CO.CCl_3$.
5. The process of claim 1 in which the perchlorofluoroacetone contains a trichloromethyl group.
6. The process which comprises mixing an asymmetric perchlorofluoroacetone containing 1 to 5 fluorine atoms and an alkali metal hydroxide, and maintaining temperature not in excess of about 40° C. during said mixing, thereby to form an alkali metal trihaloacetate wherein at least one of the halogens is fluorine and any remaining halogen is chlorine.
7. The process of claim 6 in which the alkali metal hydroxide is utilized as an aqueous solution of strength not in excess of about 40% by weight.
8. The process of claim 6 in which temperature is not in excess of about 25° C., and the alkali metal hydroxide is utilized as an aqueous solution of strength not in excess of about 25% by weight.

References Cited in the file of this patent
UNITED STATES PATENTS

| 2,480,467 | Haworth et al. | Aug. 30, 1949 |
| 2,695,918 | Gilbert et al. | Nov. 30, 1954 |

OTHER REFERENCES
Zincke et al.: Ber. 21, 2728 (1888).
Whitmore: Organic Chemistry, 2nd ed., 1951, p. 275.